E. TERRIL.
Cultivator.
No. 79,161.  Patented June 23, 1868.
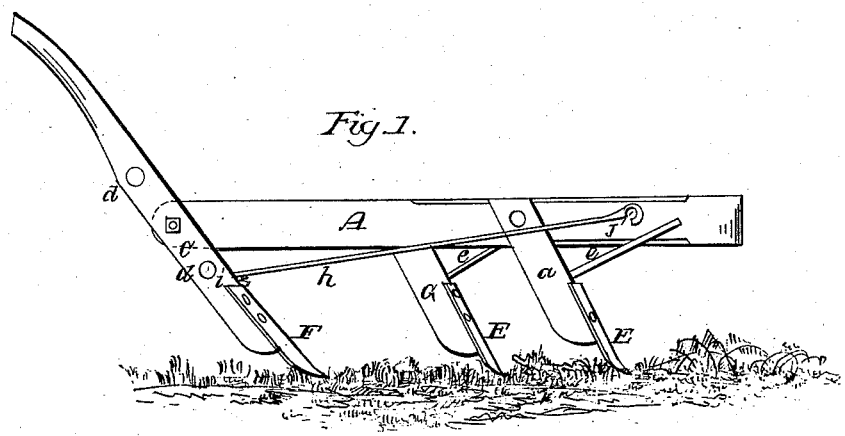
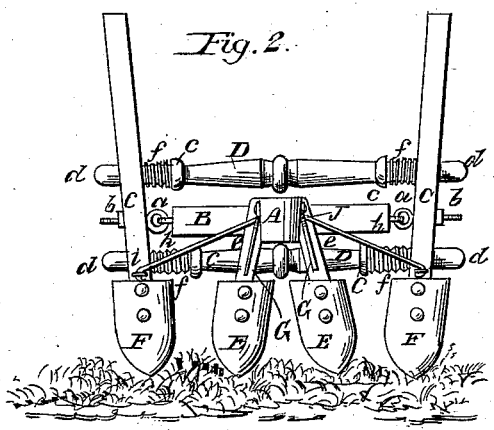
WITNESSES:
INVENTOR:

United States Patent Office.

ELBERT TERRIL, OF COLD WATER, MICHIGAN.

Letters Patent No. 79,161, dated June 23, 1868.

IMPROVEMENT IN CULTIVATOR.

*The Schedule referred to in these Letters Patent and making part of the same.*

TO ALL WHOM IT MAY CONCERN:

Be it known that I, ELBERT TERRIL, of Cold Water, in the county of Branch, and State of Michigan, have invented certain new and useful Improvements in Cultivators; and the following is a full, clear, and exact description of the same, reference being had to the accompanying drawings, making a part of this specification, in which—

Figure 1 represents a side elevation of my improved cultivator.

Figure 2 shows a front end view of the same.

The object of my invention is to make an agricultural implement that can be operated with success in various soils, where there are surface-stones, or small boulders which have the tendency to vary the direct line, and oftentimes damage the rows of plants, by guiding the shovel-points on to the rows.

My invention consists in the arrangement for connecting the guiding-handles with the draught-beam, whereby the outside shovel-points can be varied either in or out of the line of draught, with those points forward which are secured to the beam when the implement is in use, so as to accommodate the irregularities which might otherwise be made by small stones or other hard substances.

To enable others to make and use my invention, I will describe it more fully, referring to the drawings, and to the letters of reference marked thereon.

I make the beam A of hard wood, of any required size and length. Through the rear end I make a mortise sufficiently large to admit a cross-timber, B, in the ends of which are secured eyes and ring-bolts $a\ a$. The bolts passing through the handles C C are held by the screw-nuts $b\ b$ on the outside. Above and below the cross-timber B are turned pieces, D D, of timber, which have shoulders $c\ c$, and long stems $d\ d$, passing through the handles C C loosely, so that they may move easily upon them. The stems $d\ d$ are provided with spiral or coiled springs $f f f f$, between the shoulders $c\ c$ and the handles C C, so as to hold the handles at rest in their proper position, but will allow them to be vibrated sideways a sufficient distance to avoid moving the beam A, and the shovel-cultivator points E E, which are attached to the pieces G G, and secured to the beam A about midway between the rear end and the clevis, to which the chain is attached for draught. To the lower ends of the handles C C are attached shovel-pointed cultivators F F, which are controlled by the driver and holder to effect the desired purpose.

The handle-timbers C C are strengthened and held for action by brace-rods $h\ h$, connected to staples $i\ i$ just above the cultivator-blades F F, and extending forward to near the end of the beam A, and are secured by the bolt $j$. The forward stationary points E E are also held by short brace-rods $e\ e$, connecting the pieces G G with the forward end of the beam A, the whole being a substantial and very efficient agricultural implement, much needed in some soils, in various sections of the country.

Having thus fully described my invention, what I claim as new, and desire to secure by Letters Patent, is—

1. The arrangement, herein described, for connecting the handles C C and cultivator-blades F F with the beam A and stationary cultivator-points E E, so that the whole may be operated substantially as and for the purposes herein set forth.

2. I claim the round pieces D D, with their shoulders $c\ c$ and springs $f f$, in combination with the handles C C, for controlling the action of the outside cultivators, as herein specified.

In testimony whereof, I hereunto subscribe my name in the presence of—

ELBERT TERRIL.

Witnesses:
 GEO. A. COE,
 LEVI SPRAGUE.